United States Patent
Dean

(10) Patent No.: US 7,865,159 B2
(45) Date of Patent: Jan. 4, 2011

(54) REPEATER RISE-OVER-THERMAL (ROT) VALUE CALIBRATION

(75) Inventor: Richard F. Dean, Lyons, CO (US)

(73) Assignee: Qualcomm Incorporated, San Diego, CA (US)

( * ) Notice: Subject to any disclaimer, the term of this patent is extended or adjusted under 35 U.S.C. 154(b) by 1015 days.

(21) Appl. No.: 11/555,872

(22) Filed: Nov. 2, 2006

(65) Prior Publication Data

US 2007/0202826 A1 Aug. 30, 2007

Related U.S. Application Data

(60) Provisional application No. 60/762,768, filed on Jan. 27, 2006.

(51) Int. Cl.
*H04B 17/00* (2006.01)
(52) U.S. Cl. ............... 455/226.1; 455/231; 455/67.14; 375/213; 375/227
(58) Field of Classification Search ............... 455/230, 455/424, 425, 456.5, 456.6, 561, 550.1, 575.1, 455/423, 13.1, 63.1, 67.11, 67.13, 67.14, 455/562.1, 226.1, 226.3, 231, 232.1, 278.1, 455/296; 370/274, 315, 226; 375/147, 297, 375/354, 213, 224, 344; 340/870.04, 425.1
See application file for complete search history.

(56) References Cited

U.S. PATENT DOCUMENTS

| | | | | |
|---|---|---|---|---|
| 4,272,719 A * | 6/1981 | Niki et al. | ........................ | 324/72 |
| 6,469,984 B1 * | 10/2002 | Baker | .......................... | 370/232 |
| 6,489,925 B2 * | 12/2002 | Thursby et al. | ........ | 343/700 MS |
| 6,690,915 B1 * | 2/2004 | Ito et al. | .......................... | 455/7 |
| 6,834,991 B2 * | 12/2004 | Roeder | ........................... | 374/1 |
| 6,944,449 B1 * | 9/2005 | Gandhi et al. | ................ | 455/425 |
| 6,970,497 B2 * | 11/2005 | Hoshino et al. | ............. | 375/141 |
| 7,379,716 B2 * | 5/2008 | Eisenstadt et al. | ........... | 455/126 |
| 7,398,053 B2 * | 7/2008 | Kerek | .......................... | 455/20 |

(Continued)

FOREIGN PATENT DOCUMENTS

KR 2004-45102 6/2004

(Continued)

OTHER PUBLICATIONS

OA dated Apr. 21, 2010 for Korean Application Serial No. 2008-7020997, 4 pages.

*Primary Examiner*—Duc Nguyen
*Assistant Examiner*—Charles Chow
(74) *Attorney, Agent, or Firm*—Turocy & Watson, LLP

(57) ABSTRACT

An RF switch is used in the signal path to an amplifier, for example between a receiving antenna and an amplifier. The switch is used to alternately connect the amplifier between a normal signal source for the amplifier and a fixed load for calibration. The power difference between the two switch states at the output of the amplifier would then yield a calibrated measurement of a signal value, such as rise over thermal (RoT). The amount of time spent in the calibration position is maintained at a minimized level so as to reduce impact on the normal operation of the amplifier. The invention provides an ability to estimate traffic load in a repeater system based on RoT measurements of repeater reverse-link output power by determining a reverse link gain.

35 Claims, 7 Drawing Sheets

U.S. PATENT DOCUMENTS

| | | | |
|---|---|---|---|
| 2001/0012770 A1* | 8/2001 | Pol | 455/232.1 |
| 2003/0176174 A1* | 9/2003 | Seppinen et al. | 455/226.1 |
| 2004/0110520 A1* | 6/2004 | Barbara et al. | 455/506 |
| 2004/0162101 A1* | 8/2004 | Kim et al. | 455/522 |
| 2006/0240782 A1* | 10/2006 | Pollman et al. | 455/67.11 |
| 2007/0071128 A1* | 3/2007 | Meir et al. | 375/297 |
| 2007/0153314 A1* | 7/2007 | Zahner et al. | 358/1.13 |
| 2007/0171116 A1* | 7/2007 | Fuse et al. | 341/161 |
| 2007/0171840 A1* | 7/2007 | Kim et al. | 370/252 |
| 2008/0137789 A1* | 6/2008 | Cranford et al. | 375/354 |

FOREIGN PATENT DOCUMENTS

| | | |
|---|---|---|
| WO | 0079821 A | 12/2000 |
| WO | 0148945 A | 7/2001 |
| WO | 03044970 A | 5/2003 |

* cited by examiner

REPEATER RISE-OVER-THERMAL (ROT) VALUE CALIBRATION

CLAIM OF PRIORITY UNDER 35 U.S.C. §119

The present application for patent claims priority to Provisional Application No. 60/762,768 entitled "REPEATER RISE-OVER-THERMAL (ROT) VALUE CALIBRATION" filed Jan. 27, 2006, and assigned to the assignee hereof and hereby expressly incorporated by reference herein.

BACKGROUND OF THE INVENTION

1. Field of the Invention

The present invention relates to the field of communications. More particularly, the present invention relates to monitoring traffic on a repeater used in a wireless communication system, such as a framed shared channel wireless communication system.

2. Description of the Related Art

Wireless communication systems are widely deployed to provide various types of communication such as voice and data. A typical wireless data system, or network, provides multiple users access to one or more shared resources. A system may use a variety of multiple access techniques such as frequency division multiplexing (FDM), time division multiplexing (TDM), code division multiplexing (CDM), and others. Examples of wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Repeaters are used in wireless communication systems in order to extend the range and coverage of the communication system. In general, repeaters receive and retransmit signals at the physical layer, and are able to provide satisfactory operation regardless of the standard being used by the wireless communication system. Repeaters are advantageous in that they provide an economical means to extend the range of a framed shared channel wireless communication system, particularly in cases where sufficient capacity exists, but signal propagation is difficult.

One technique for taking power measurements relevant to traffic is obtaining rise-over-thermal (RoT) measurements. In a communication system such as a CDMA system, RoT is a signal property value which is useful for providing an indication of the channel loading on the reverse link. The RoT value is the ratio, typically given in decibels (dB), of total power received from all users at a receiver, over the thermal noise. Based on theoretical capacity calculations for a reverse link, there is a theoretical curve that shows the rise-over-thermal value increasing with loading. The loading at which the rise-over-thermal value is infinite is often referred to as the "pole". In a typical CDMA system, a loading that has a rise-over-thermal value of 3 dB corresponds to a loading of about 50%, or about half of the number of users that can be supported when at the pole. As the number of users increases and as the data rates of the users increase, the loading becomes higher. Correspondingly, as the loading increases, the amount of power that a remote terminal must transmit increases. Similar considerations exist for other types of communication systems. The rise-over-thermal value and channel loading are described in further detail by A. J. Viterbi in "CDMA: Principles of Spread Spectrum Communication," Addison-Wesley Wireless Communications Series, May 1995, ISBN: 0201633744. The Viterbi reference provides classical equations that show the relationship between the rise-over-thermal value, the number of users, and the data rates of the users.

RoT is generally referenced to the input power of the receiver with no traffic. It is therefore possible to take a measurement of the equivalent thermal noise floor, with the increase in output power described as the rise. Rise-over-thermal (RoT) measurements are used to estimate load of a wireless receiver, and therefore can be used to measure repeater load. RoT is a ratio of thermal and the total received input power. The key assumption is that one can derive a reasonable model for the aggregate impact of all users by starting with the impact of a single, average user. RoT can be derived from:

$$Z_l = \frac{\sum_{i=1}^{N} P_i g_i}{N_0 W} \quad \text{Equation (1)}$$

where:

Z1 is the RoT for a communication station,

Pi is the transmitted power for the user I, gi is the gain for the user,

N is the number of users,

N0 is the receiver's thermal noise density,

W is the receiver bandwidth, given in Hz

In some cases, repeaters are in locations where link traffic volume is not a significant issue; however, there are some cases in which the repeater is used in a circumstance in which link traffic and network capacity are considerations. As a result, there are cases in which it is desired to measure link traffic on repeaters. Specifically, it is desirable to include the ability to estimate repeater traffic load based on measurements of repeater reverse-link output power.

Reverse-Link Loading at the Base Station

In the case of the reverse link, an important parameter is the RoT, which corresponds to the reverse link loading. A loaded CDMA system attempts to maintain the RoT such that the system operates at or below a critical level of RoT. The critical level of RoT occurs when the cell shrinks and quality of service (QoS) starts to degrade. If the RoT is too great, the range of the cell is reduced and the reverse link is less stable. A large RoT also causes small changes in instantaneous loading that result in large excursions in the output power of the mobile station. A low RoT can indicate that the reverse link is not heavily loaded, thus indicating excess capacity. It will be understood by those skilled in the art that methods other than measuring the RoT that can be used to determine the loading of communication devices.

Assume an average target Eb/Nt is required by each call in a sector in order that all calls meet the desired frame-error-rate (FER). Call this target value T:

$$T = \frac{E_b}{N_t} \quad \text{Equation (2)}$$

where $E_b$ is the average energy per data bit at the base station receiver.

$N_t$ is the sum of the base station receiver's thermal noise density $N_0$ and the interference power density $I_0$.

$I_0$. is determined by:

$$I_0 = \frac{(n-1)C}{W} \quad \text{Equation (2a)}$$

T is the ratio of the average power per user received at the base station, vC, to the average data rate vR:

$$E_b = \frac{vC}{vR} \quad \text{Equation (3)}$$

where v is the average voice activity factor,

C is the average power received per full-rate user,

R is the data rate, $N_0$ is the receiver's thermal noise density.

If there are $n$ total users in the sector, the interference power density from the other users is:

(n−1)C/W    Equation (4)

where W is the signal bandwidth.

To account for the voice activity factor, one can multiply this quantity by v (typically taken to be 0.4). To account for other cell interference, divide this quantity by F, the ratio of in-cell to total interference power density (typically taken to be 0.65).

Substituting these values into Equation (2), we obtain $$T = \frac{\frac{C}{R}}{N_0 + \frac{(n-1)Cv}{WF}} \quad \text{Equation (5)}$$

This equation can be solved for C. Defining W/R=g as the processing gain, and approximating n−1 as n (which the receiver AGC does anyway), one obtains an expression for the average power received per full-rate user at the base station:

$$C = (N_0 W)\left(\frac{T}{g}\right)\frac{1}{1 - n\left(\frac{vT}{gF}\right)} \quad \text{Equation (6)}$$

If the base station is also servicing a repeater, this received power per user is the same whether the call comes through the repeater or not. In fact the base station generally can't differentiate between direct connections to users and connections through repeaters.

Reverse-Link Power Out of the Repeater

The equivalent thermal noise floor of the repeater can be represented by:

$$\Gamma = k(T_0 + T_e)WG_R \quad \text{Equation (7)}$$

where:

$G_R$ is the repeater's reverse-link gain,

Then the power being transmitted out of the repeater on the reverse link is given by $$P_R = \Gamma + \frac{n_r C}{FL_p G_d G_a} \quad \text{Equation (8)}$$

where:

$G_a$ is the base station antenna gain, $G_d$ is the repeater's donor antenna gain, $L_P$ is the path loss between base station and repeater, nr is the number of calls passing through the repeater, where F is the ratio of in-cell to total interference power density Dividing both sides of this expression by the repeater thermal noise floor gives the repeater output power expressed as RoT.

Equation (8) is of interest in that it provides an indication of receiver capacity for users as a function of carrier output power, the number of users, number of users on multiple carriers, percentage of base transmitter (BTS) capacity, and capacity in Erlangs of traffic.

U.S. Pat. No. 6,469,984, commonly assigned, describes a method for estimating the reverse link traffic going through the repeater by measuring the rise-over-thermal value in the repeater reverse link channel by monitoring traffic on a CDMA repeater. A measuring circuit receives a metric related to CDMA repeater operations and determines the amount of call traffic on the CDMA repeater based upon the metric. Determining that the traffic over the CDMA repeater is too heavy is used to indicate the need to replace the CDMA repeater with the base station to provide better wireless communication service. The circuit monitors the amount of call traffic based on signal power of the CDMA repeater and a power meter reads the signal power of the CDMA repeater so that the circuit receives the signal power of the CDMA repeater from the power meter. The circuit then determines the number of users on the CDMA repeater based on the signal power from the power meter. This determination is made by a formula where the signal power is proportional to the number of users on a CDMA repeater. The repeater measurement system may store the number of repeater users in memory or transmit the number of repeater users to a remote location.

In practice, the actual rise-over-thermal value is a small number of dB, and the gain uncertainty of the reverse link amplifier gain and noise figure make the measurement uncertainty approximately that of the desired rise-over-thermal measurement. It would be desired to provide a way to calibrate the gain and noise figure of the repeater gain stage such that an accurate rise-over-thermal measurement can be made.

One of the problems in measuring equipment used in a wireless network is that it is difficult to take the equipment "off-line". In the case of manual maintenance, it is possible to do so (take the equipment off-line) but there becomes a tradeoff between optimum time between testing and QoS. QoS is degraded by equipment frequently taking equipment off-line when users are connected to the equipment. In the case of framed shared channel wireless communication systems, each frame has a time period, that is either defined by the cognizant standard or that is otherwise predictable. For example, in the case CDMA wireless communication conforming to the IS-95 standard, the frame length is approximately 20 ms.

SUMMARY

According to the present invention, gain and noise for a signal is calibrated in a radio frequency communication station and capable of obtaining a measurement based on received power. An input to an amplifier in the communication station is switched between a signal source and a fixed input load. A difference between an output of the amplifier corresponding to a first switch state corresponding to the signals received by the amplifier from the signal source and a second switch state corresponding to the amplifier connected to the predetermined input load is used to obtain power-related measurements. The output of the amplifier corresponding to the first and second states yields the power difference between the two switch states at the output of the amplifier, which is in turn used to yield a calibrated measurement. The calibrated measurement may be a rise-over-thermal (RoT) value, corresponding to a ratio of total power received by the amplifier, over thermal noise from the amplifier, or another measurement of a signal quality.

in one aspect of the invention, this is achieved by establishing time parameters limited by maximum time at which communication received by an amplifier from the signal source degrades within predetermined limits and a minimum time required to obtain a quiescent state measurement, and switching the input within the established time parameters.

In another aspect of the present invention, a communication device, such as a repeater provides a measurement of communication signal traffic. A switch connected to a signal input of a signal amplifier, is used to switch between a received signal and a predetermined load. A controller is used to control the switching between the signal and load at an operational mode test rate, such that the operational mode test rate having a signal input off time less than a time selected in accordance with loss of a communication link, and a load connection time greater than a minimum quiescent time for obtaining a measurement of the electrical property in a quiescent mode. The control of the switching allows sensing of the signal input in said quiescent mode without interrupting communication transmitted through the signal amplifier.

BRIEF DESCRIPTION OF THE DRAWINGS

The features, nature, and advantages of the present invention will become more apparent from the detailed description set forth below when taken in conjunction with the drawings in which like reference characters identify corresponding items throughout and wherein.

DETAILED DESCRIPTION OF THE INVENTION

Figure 1:
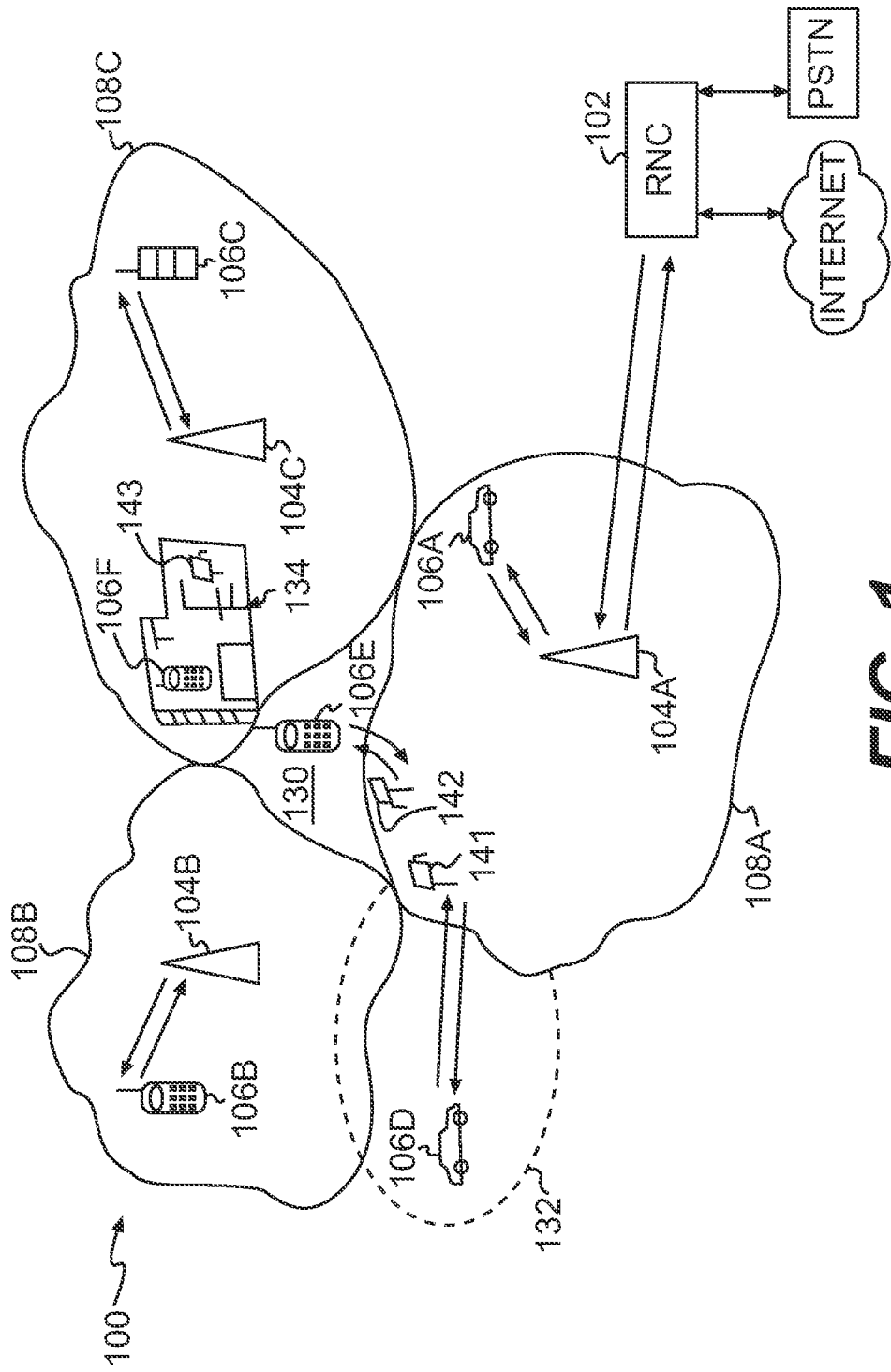
FIG. 1 is a diagram illustrating an example of a wireless communication network.

The word "exemplary" is used herein to mean "serving as an example, instance, or illustration." Any embodiment described herein as "exemplary" is not necessarily to be construed as preferred or advantageous over other embodiments.

Overview

According to the present invention, calibration of gain and noise figure of the repeater gain stage is effected such that an accurate rise-over-thermal (RoT) measurement can made.

An RF switch is added to the repeater in the reverse link gain path, between the server antenna and the reverse link amplifiers. Using a SPDT RF switching circuit, with the common port connected to the amplifiers, and one switched port connected to the donor antenna for normal operation, and the other switched port connected to a signal input load. The RF switch substantially attenuates the input of the server antenna to the reverse link amplifiers. The signal input load functions in the manner of a dummy load, except that, as an input load, it is not required to dissipate a substantial amount of energy. Instead, it establishes an input status of the amplifier in accordance with the design input impedance for the amplifier. The signal input load is, by way of example, a 50 ohm RF load. The 50 ohm RF load is intended to replace a 50 ohm antenna input, although it is possible that the design impedance of the operational equipment (antenna and amplifier) may vary from the 50 ohms. The signal input load is intended to set an input impedance status similar to that of the input with a signal input or antenna, but without the signals received by the signal input or antenna. The RF load may be a nominal load or a calibrated load. The RF load is a predetermined calibration load used for calibration of the thermal noise level. In either case, the RF load provides an appropriate input impedance for the amplifiers and provides the calibration input. The RF load generally matches the input impedance of the amplifiers at the connection of the amplifiers to the antenna or duplexer. The RF load is used for calibration of the thermal noise level.

In more general terms, the signal sensed by the amplifier with the antenna input connected to the antenna input is the active mode signal and the signal sensed by the amplifier with the dummy input load connected is the quiescent mode signal. A comparison of the active mode signal with the quiescent mode signal renders a value of the traffic. In the case of power measurements, the power at the quiescent mode is the thermal noise level, and the comparison is a calibrated measurement effected between the operation of the amplifier with the active mode signal and the amplifier operating without the active mode signal.

In normal operation, the switching circuit would connect the reverse link amplifier chain to the server antenna so that normal reverse link traffic could go through the repeater. The amplifier may be any convenient amplifier, such as, for example, a linear RF amplifier capable of amplifying a received signal for retransmission In the calibration mode, the input to the reverse link amplifier would be from the 50 ohm load. The power difference between the two switch states at the output of the amplifier would then yield a calibrated measurement of the rise-over-thermal value.

In practice, the amount of time spent in the calibration position may be minimized so as to not impact the users. The invention provides measurements satisfactory for obtaining the RoT value by use of the switching technique. By switching the amplifier input to a known source of no signal and thermal noise equivalent, the gain and the noise figure the amplifier can be calibrated, so that the intended small RoT measurement can be accurate. In the case of a repeater, the RF switch will take the repeater off line for a small period to estimate thermal noise. This time off line may be manually controlled or may be scheduled by a processor. The scheduling could be optimized such that the event to go off line would be dictated by detecting traffic, so that the repeater is taken off line when the repeater is "seeing" minimal traffic, as measured by it's RoT measurement.

When RoT is below a predetermined threshold, then RoT is subjected to a nominal sampling cycle for minimum traffic in which sampling for ROT is performed frequently. When RoT exceeds the predetermined threshold, the repeater is caused to go to a longer duty cycle. By way of example, the predetermined threshold can be set at 3 dB, the minimum traffic sampling cycle can be set at 2 minute sampling and the longer duty cycle set at 30 minutes. When RoT is below the predetermined threshold of 3 dB, the repeater is subjected to 2 minute sampling. When RoT exceeds the predetermined threshold of 3 dB, the repeaters is caused to go to a minimum duty cycle in which samples are taken every 30 minutes. By scheduling the RoT thermal noise measurement when less traffic was going through the repeater, then the impact to the customers is minimized.

A significant aspect of measurement relates to the frame cycle of the communication. Quality of service (QoS) is degraded by equipment frequently taking equipment off-line when users are connected to the equipment. In the case of framed shared channel wireless communication systems, each frame has a time period, that is either defined by the cognizant standard or that is otherwise predictable. For example, in the case CDMA wireless communication conforming to the IS-95 standard, the frame length is approximately 20 ms. For cdma2000 systems the frames can be 5, 10, 20, 40 or 80 mS. Other systems, such as WCDMA use a similar array of frame sizes, for example, 10 and 20 mS. The use of error correction schemes and other techniques permits the communication link to tolerate a significant amount of data loss within the frame. This amount of data loss corresponds to a predetermined fast fade time tolerated by the communication system. This permits the framed shared channel wireless communication system to tolerate fast fading events while retaining good QoS.

The use of error correction schemes and other techniques permits the communication link to tolerate a significant amount of data loss within the frame. Typically, a mobile user operating at PCS frequencies and traveling at 60 mph will experience repeated outages of approximately 1.5 milliseconds due to multipath or fast fading. The CDMA air interface has been explicitly designed for robust operation over a channel in a fast fading environment.

According to the present invention, a test sequence is performed in which power measurements are taken with the signal disconnected, but within a time sequence which permits continuation of normal communication. The ability of the framed shared channel wireless communication system to tolerate data loss permits the communication link to be interrupted for a fractional portion of the length of a frame cycle. While it is desirable not to corrupt a frame, missing a frame every few minutes is hardly detectable to the average cell phone user. Therefore, although it's nice not to adversely affect the signal, the adverse effect is relatively insignificant as far as QoS factors are concerned.

By selecting the fraction portion of the length sufficiently short, it is possible to effect the measurement while not substantially deteriorating QoS. According to the present invention, this time period is selected as having a time period sufficient to effect a desired measurement of the signal with the signal disconnected from normal use, but less than a time period which would result in communication interruption resulting from a fast fading condition. It is possible to have the signal disconnected for hundreds or thousands of milliseconds without calls dropping, but there will be a significant impact on QoS. The duration of the test period is therefore selected so as to prevent substantial data loss on a communication link or significant adverse impact on QoS of a communication link. In CDMA systems transmitting voice signals, loss of 1% of the frames is generally not noticeable. As the percentage of lost frames increases, for example to 3%, QoS is noticeably degraded. The system is designed so that a typical fading rate does not substantially degrade QoS for the users to an extent that the users will notice signal loss. In a further aspect of the invention, the power measurement is used in combination with a further measurement taken with the signal connected for normal conversation in order to obtain a measurement of power indicative of communication traffic. A specific configuration provides for a sequence of power measurements that are resolved to a rise over thermal (RoT) measurement.

Operational Environment

FIG. 1 is a diagram illustrating an example of a wireless communication network (hereinafter "network") 100 using one or more radio network controllers (RNCs) 102, or local control stations such as base station controllers (BSC) or Node Bs, and a plurality of base stations (BS) 104A-104C, sometimes referred to as base station transceiver systems. Base stations 104A-104C communicate with remote stations or wireless communication devices (WCDs) 106A-106C that are within service areas 108A-108C of base stations 104A-104C, respectively. In the example, base station 104A communicates with WCD 106A within service area 108A, base station 104B with WCD 106B within service area 108B, and base station 104C with WCD 106C within service area 108C.

WCDs 106A-106C each have or comprise apparatus for wireless communications such as, but not limited to, a cellular telephone, a wireless handset, a data transceiver, or a paging or position determination receiver. Furthermore, such WCDs can be hand-held, portable as in vehicle mounted (including cars, trucks, boats, trains, and planes) or fixed, as desired. Wireless communication devices are also sometimes referred to as user terminals, mobile stations, mobile units, subscriber units, wireless transmit/receive units, mobile radios or radiotelephones, wireless units, or simply as "users", "phones", "terminals", or "mobiles" in some communication systems, depending on preference.

Base stations 104A-104C transmit information in the form of wireless signals to user terminals across forward link communication channels (forward links or downlinks), and WCDs transmit information over reverse link communication channels (reverse links or uplinks). Base stations 104A-104C may form part of a wireless communication system, such as a terrestrial based communication systems and networks that include a plurality of cell sites. Signals can be formatted in accordance with any appropriate standard, such as IMT-2000/UMT standards, using WCDMA, cdma2000 or TD-SCDMA type signals. Additionally, base stations 104 can be associated with other systems such as analog based communication system (such as AMPS), and transfer analog based communication signals. WCDs 106A-106C and base stations 104A-104C use signals that are encoded, spread, and channelized according to the transmission standards of the network. By way of example, a forward CDMA link includes a pilot channel or signal, a synchronization (sync)-channel, several paging channels, and a larger number of traffic channels, while the reverse link includes an access channel and a number of traffic channels. The signals use data frames having a predetermined duration, such as 20 milliseconds. These parameters are by way of example, and the present invention may be employed in systems that employ other wireless communication techniques.

The wireless signals are transmitted at power levels sufficient to overcome noise and interference so that the transfer of information occurs within specified error rates; however, these signals need to be transmitted at power levels that are not excessive so that they do not interfere with communications involving other WCDs. Faced with this challenge, base stations and WCDs in some communication techniques employ dynamic power control techniques to establish appropriate transmit power levels. By way of example, some approaches involve a user terminal determining signal-to-noise ratios (SNRs), signal-to-interference ratios (SIR) or error rates (BER, FER, etc.) of received forward link traffic signals, and requesting the base station to either increase or decrease the transmit power of traffic signals sent to the WCD based on the results. In addition to transmitting up/down commands, other types of information may be transmitted to base stations periodically including various power and noise measurements to support operations, such as "handoffs" between base stations. Examples of techniques for exercising power control in such communication systems are found in U.S. Pat. No. 5,383,219, entitled "Fast Forward Link Power Control In A Code Division Multiple Access System," U.S. Pat. No. 5,396,516, entitled "Method And System For The Dynamic Modification Of Control Parameters In A Transmitter Power Control System," and U.S. Pat. No. 5,056,109, entitled "Method and Apparatus For Controlling Transmission Power In A CDMA Cellular Mobile Telephone System."

The service area of a base station is affected by local topography, obstructions (buildings, hills, and so forth), signal strength, and interference from other sources dictate the shape of the region serviced by a given base station. Typically, multiple coverage areas 108 (108A-108C) overlap to provide continuous coverage or communications over a large area or region; however there are some areas that may not be covered, such as uncovered regions 130 and 132. Uncovered regions, such as a hole 130 or a region 132, that are outside of the network's normal coverage areas result in intermittent service. Additionally, topological features such as mountains or hills, man made structures, such as tall buildings or urban canyons often created in central urban corridors, or vegetation, such as tall trees, forests, or the like, could each partially or completely block signals. Similar conditions exist inside structures 134.

In many cases, it may also be more amenable to using one or more repeaters to extend coverage to holes or uncovered regions. One technique of extending coverage is through the use of repeaters 141-143. Repeaters 141-143 accept transmissions from both a WCD 106 (106D, 106E and 106F) and a base station 104A or 104C, and act as an intermediary between the two, essentially operating as a "bent pipe" communication path. By using a repeater 141-143, the effective range of a base station 104 is extended to areas 130, 132 and 134 that would otherwise have gaps in coverage.

Repeaters generally function at the physical level and generally do not process the signals at the logical level, and so the repeater transfers signals with the data at the logical level unchanged. Therefore, measurements related to traffic are most conveniently effected by measuring at the physical level.

Repeater Operation

Figure 2:
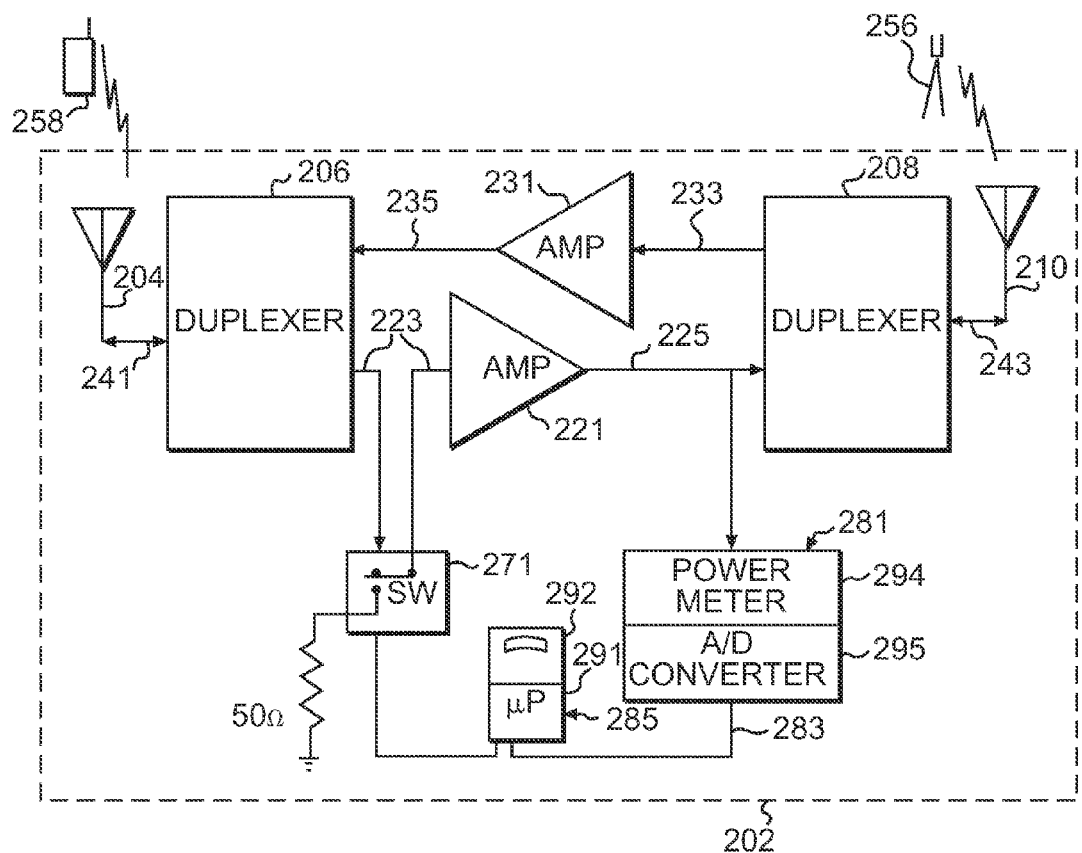
FIG. 2 is a schematic block diagram showing a repeater used in accordance with the present invention.

FIG. 2 is a schematic block diagram showing a repeater 202 used in accordance with the present invention. The repeater 202 is comprised of a server antenna 204, a server duplexer 206 a donor output duplexer 208 and a donor antenna 210. A reverse link or uplink amplifier 221 is connected to the server duplexer 206 by an input link 223 and to the donor output duplexer 208 by an output link 225. A forward link or downlink amplifier 231 is connected to the donor duplexer 208 by a forward link connection output 233 and is connected to the server duplexer 206 by a forward link connection input 235. A server antenna link 241 connects the server antenna 204 to duplexer 206 and a donor antenna link 243 connects the donor antenna to duplexer 208. The depiction of a single amplifier in each of the forward and in the reverse directions is a simplification, and in practice, the reverse and forward link amplifiers 221, 231 are each configured as multiple amplifiers, such as a low noise amplifier and a power amplifier.

While duplexers 206, 208 are shown, it is possible to construct the repeater 202 with discrete transmit and receive antennas on both the server side (antenna 204) and the donor side (antenna 210).

In the forward path, the donor antenna 210 receives a wireless signal from a base station 256. The donor antenna 210 transmits the received signal to duplexer 208 through the donor antenna link 243. Duplexer 208 receives the signal and transmits the signal to the forward link amplifier 231. The forward link amplifier 231 amplifies the signal from the duplexer 208 and transmits the signal to server duplexer 206. Server duplexer 206 receives the signal and transmits the signal to the server antenna 204 through the server antenna link 241. The server antenna 204 receives the signal from server duplexer 206 and transmits a wireless signal to a wireless communication device (WCD) 258 such as a mobile phone.

In the reverse path, the server antenna 204 receives a framed shared channel communication signal from a communication device 258. The server antenna 204 transmits the received signal to server duplexer 206 through the server antenna link 241. Server duplexer 206 receives the received signal and transmits the received signal to the reverse link amplifier 221 through the server antenna link 241. The reverse link amplifier 221 amplifies a framed shared channel communication signal from server duplexer 206 and transmits the signal to duplexer 208 through the output link 225. The duplexer 208 receives the signal from the reverse link amplifier 221 and transmits the signal to the donor antenna 210 through the donor antenna link 243. The donor antenna 210 receives the signal from the duplexer 208 and transmits a wireless signal to the base station. This reverse operation comprises the reverse link of the repeater for communication from the mobile phone to the base station.

Switching for Signal Measurements

An RF switch 271 is added to the repeater in the reverse link gain path, between the server antenna 204 and the reverse link amplifier 221. In the configuration depicted, the switch is interposed between the server duplexer 206 and the reverse link amplifier 221. The RF switch 271 performs its switching function as a SPDT RF switching circuit, with the common port connected to the amplifiers, and one switched port connected to the donor antenna (through the server duplexer 206) for normal operation, and the other switched port connected to a 50 ohm load for calibration (the thermal noise level). In normal operation, the switching circuit 271 would connect the reverse link amplifier chain to the server antenna so that normal reverse link traffic could go through the repeater. In the calibration mode, the input to the reverse link amplifier would be from the 50 ohm load. The 50 ohm load is a calibration load and is intended to match the input impedance supplied to the amplifier 221 from the antenna 204 and duplexer 206. The power difference between the two switch states at the output of the amplifier would then yield a calibrated measurement of the rise-over-thermal value. In practice, the amount of time spent in the calibration position may be minimized so as to not impact the users. An example of an RF switch, useful with wireless telecommunications, is a Minicircuits ZSDR-230 switch. An example of a 50 ohm load is a Minicircuits ANNE-50 RF load. An example of a power detector is an LT5534 RF Log Power Detector, providing an output of 40 mV/dBm*Pin(dBm)+2400 mV, taken his over an input range of −50 to −5 dBm.

Also depicted in FIG. 2 is an integrated power detector 281. Integrated power detector 281 has an output link 283 to a control circuit 285. The control circuit 285 includes a processor 291 and a memory 292, and functions as a controller to control the operation of RF switch 271. Integrated power detector 281 includes a power sensor 294 and an A/D converter 295. The control circuit 285 (FIG. 2) uses signals from integrated power detector 281 to determine the output power of the reverse link amplifier 271. The integrated control circuit 285 uses signals from integrated power detector 281 to determine gain and uses a processor 291 which controls amplifier 221 in response to instructions stored in memory 292. Typically the signals provided by the integrated power detector 281 to the control circuit 285 are power metrics.

The repeater 202 of FIG. 2 may be used as a monitored or unmonitored CDMA repeater system or as a part of a monitored or unmonitored CDMA repeater system. The repeater 202 may also be used as a monitored or unmonitored repeater system for any wireless communication system.

Figure 3:
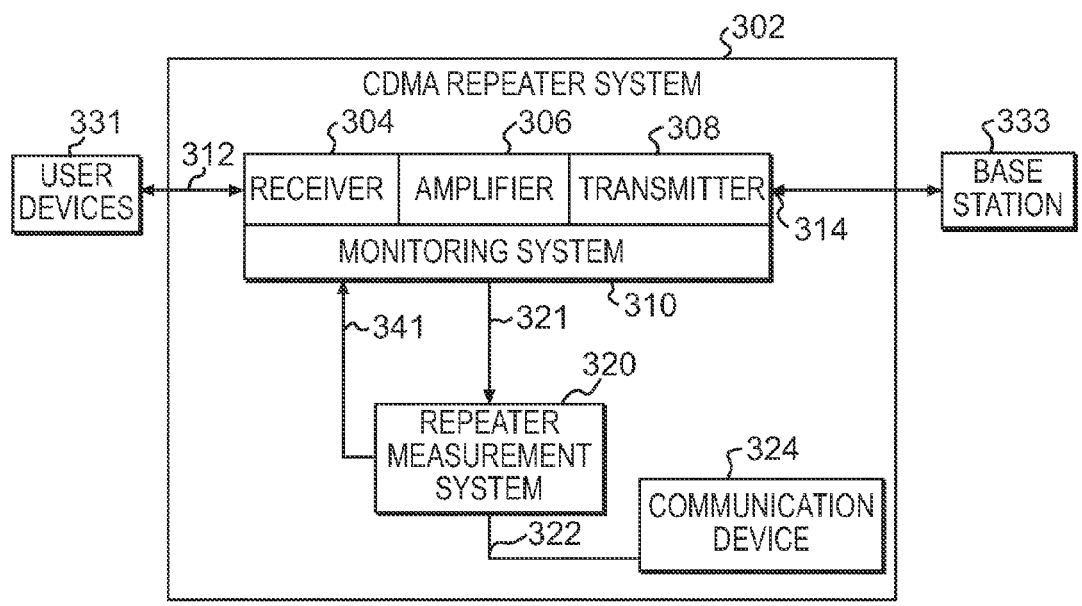
FIG. 3 is a schematic block diagram depicting a monitored CDMA repeater system, depicting the functions of the components performing reverse link functions.

FIG. 3 is a schematic block diagram depicting a monitored CDMA repeater system 302, depicting the reverse link functions. The reverse link of the repeater system 302 is comprised of a receiver 304, an amplifier 306, a transmitter 308, a monitoring system 310, an output link 321, a repeater measurement system 320, and a communication link 322 connected to a communication device 324. FIG. 3 depicts the functions of the components, in which receiver 304, amplifier 306 and transmitter 308 collectively perform the function of amplifier 221 in FIG. 2. Similarly, repeater measurement system 320 performs the functions described in connection with power detector 281, control circuit 285 and switch 271, also depicted in FIG. 2.

The input CDMA signals 312 from user devices 331 are received by the receiver 304. The receiver 304 is connected to the amplifier 306. The amplifier 306 is connected to the transmitter 308. The transmitter 308 transmits the output CDMA signals 314 to a base station 333. In various configurations, the monitoring system 310 could be connected to the receiver 304, the amplifier 306, and/or the transmitter 308. The repeater measurement system 320 is connected to the monitoring system 310 by the output link 321 and to the output link 322. Those skilled in the art are aware that there are numerous other components and configurations that could be used for the repeater system.

The monitoring system 310 can measure a metric from the receiver 304, the amplifier 306, and/or the transmitter 308. The monitoring system 310 then transmits the metric to the repeater measurement system 320 over the output link 321. The repeater measurement system 320 receives the metric from the monitoring system 310 and determines the amount of the call traffic on the CDMA repeater system 302 based on the metric. The repeater measurement system 320 controls the monitoring system 310 by controlling the switching of the RF switch (271, FIG. 2), as depicted by switch control 341. This enables the monitoring of functions related to traffic, such as RoT.

The repeater measurement system may be co-located with the CDMA repeater (elements 304, 306, 308, and 310) or may be remotely located. The repeater measurement system 320 may transmit the amount of the call traffic over the output link 322. An example of the repeater measurement system 320 is a personal computer configured with software to support the invention. The repeater measurement system 320 may determine whether the current power level exceeds a predetermined power level and transmit a signal in response to a positive determination that the current power level exceeds the predetermined power level. Therefore, the repeater measurement system 320 may determine whether the RoT or another factor related to current power level exceeds a predetermined power level and transmit a signal in response to a positive determination that the current power level exceeds the predetermined power level. Alternatively, the repeater measurement system 320 may store in a memory the current power level. Alternatively, the repeater measurement system 320 may store in a memory the current RoT or the current power level. In the case of obtaining RoT measurements, the current power level is used.

Figure 4:
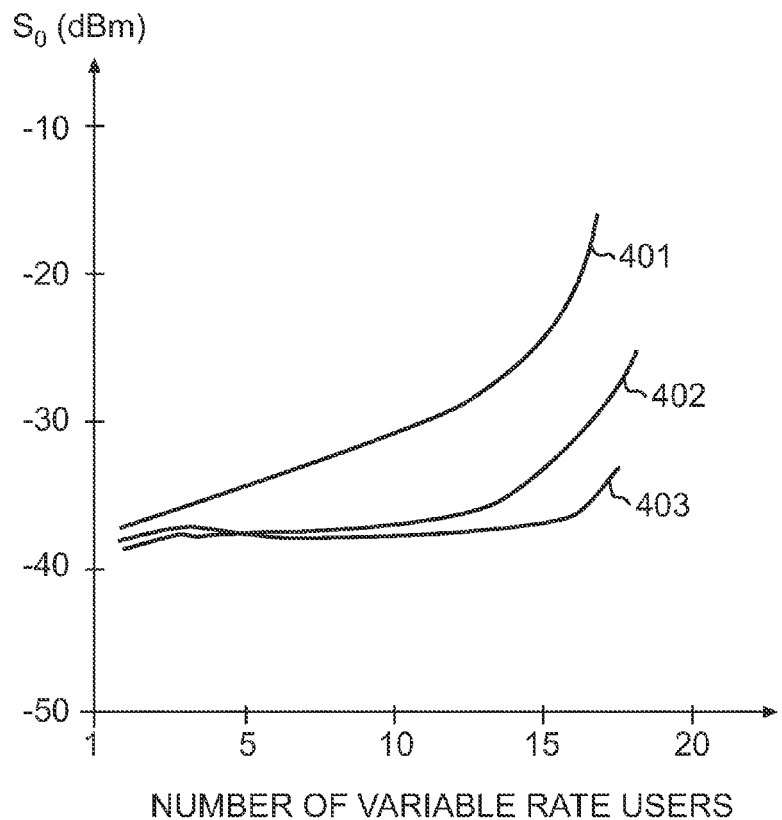
FIG. 4 is a set of graphs for the number of repeater users vs. the output signal power for a noisy repeater for three different total link gains.

With the RoT, it is possible to determine certain traffic-related functions, such as number of users. FIG. 4 shows that the signal output power will increase proportionally to the number of users on a repeater. It can be seen, however, that the values for the repeaters at different gains 401, 402, 403 are very close when the number of users is relatively low (left side of the graph). Therefore, when there are a low number of users, the RoT value is small. Hence, it is necessary to obtain an accurate calibration value in order to obtain an accurate measurement of the RoT value.

Operation of Repeater Measurement System

Figure 5:
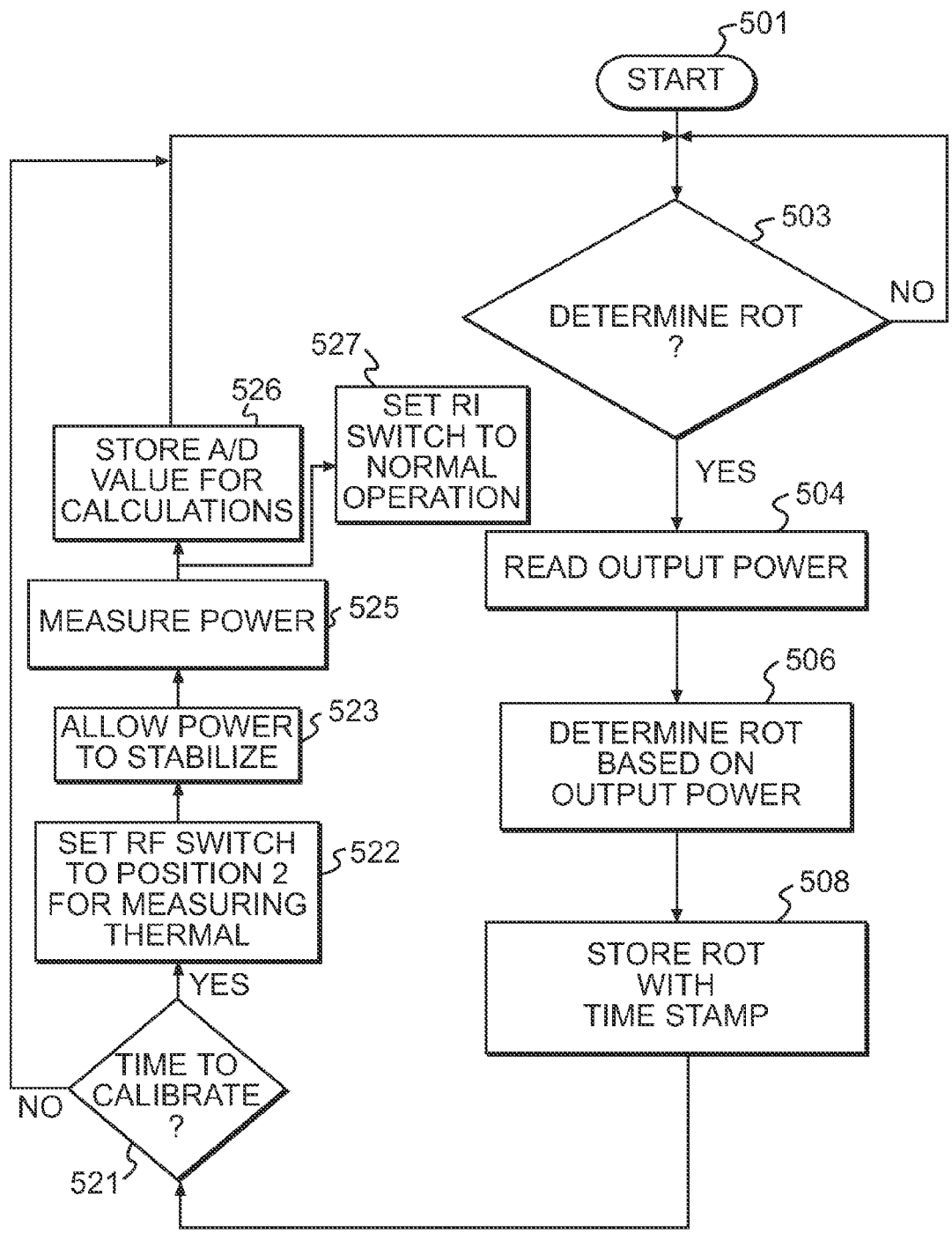
FIG. 5 is a flow chart illustrating the inventive process.

FIG. 5 is a flow chart illustrating the inventive process. After start (step 501), the processor determines if a RoT measurement is to be performed (step 503). Output power is read (step 504) and a determination of RoT is made based on output power (step 506). The RoT value is then stored with a timestamp (step 508)

The processor then determines if a calibration procedure of a baseline thermal noise level may advantageously be made (step 521). The determination of requirement for calibration (step 521) is based on time since last calibration, number of readings or another factor (step 521). If the calibration procedure is required, then the RF switch (271, FIG. 2) is set to the standard load (step 522). The output of the amplifier is allowed to stabilize (step 523), which is typically a very short time period. The output power is then read with the standard load applied to the amplifier (step 525). The value of the output power is then stored as the calibration value (step 526), and the RF switch is set to normal operation (step 527). The setting of the RF switch to normal operation (step 527) and the storing of the output as the calibration value (step 526) can be performed in either order.

The calibration value is then used for subsequent determinations of RoT in step 506. In the case of the calibration for baseline thermal noise level being determined not required, no update is made. In either case the determination of RoT is made (step 503), thereby repeating the loop. This enables the monitoring of functions related to traffic, such as RoT, as well as other computations based on RoT such as number of users or percent of channel capacity consumed. These measurements can be taken with a comparison of the thermal noise level based on no users as required.

The sequence of setting the RF switch to the standard load (step 522) ending with setting the RF switch to normal operation (step 527) is performed within a time period calculated to be sufficient to obtain the necessary reading (steps 523, 525) but brief enough to not cause significant deterioration in QoS.

Functional Operation of Calibration

Figure 6:
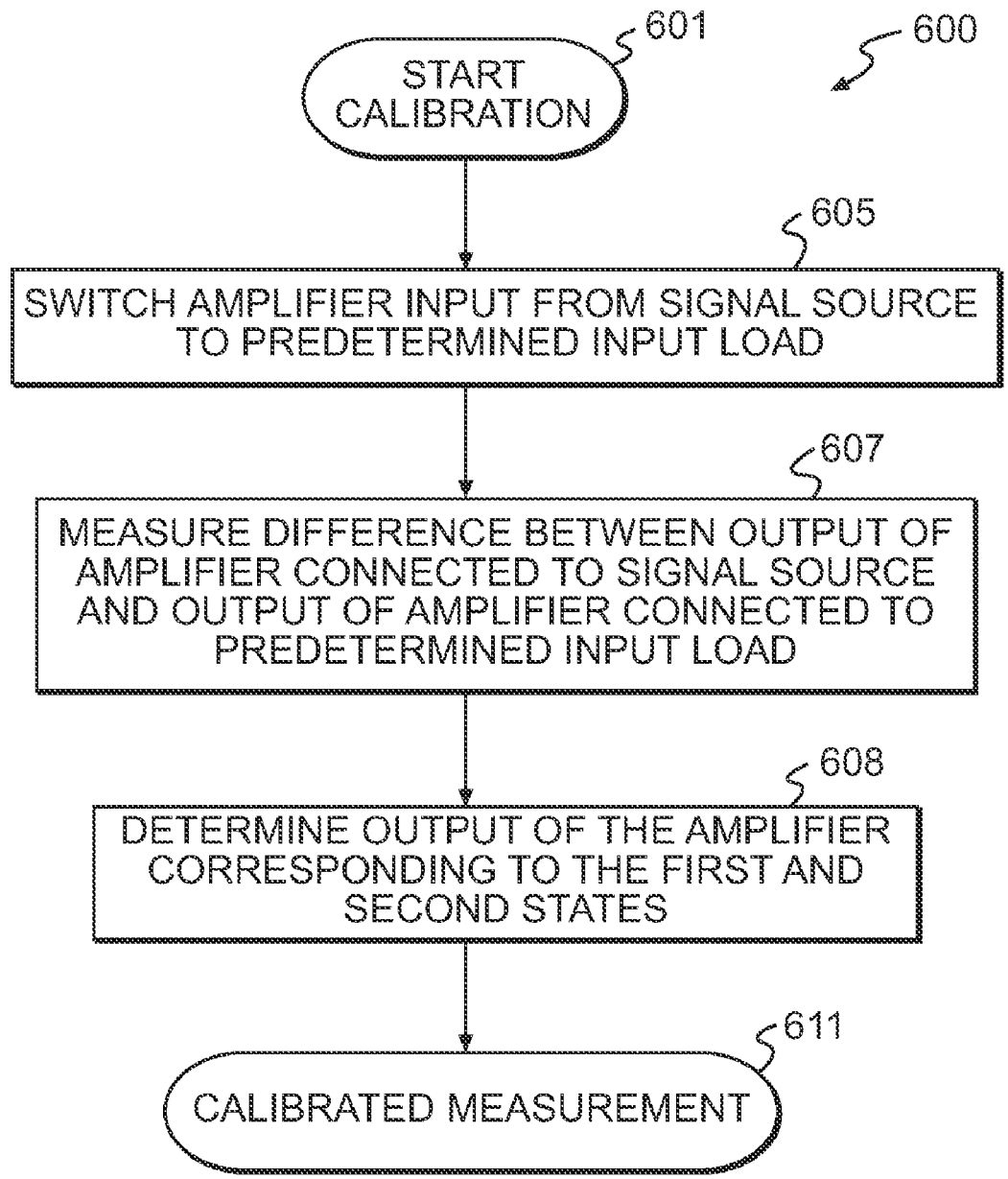
FIG. 6 is a flow chart showing a process for calibrating gain and noise of a signal in accordance with the present invention.

FIG. 6 is a flow chart showing a process 600 for calibrating gain and noise of a signal in accordance with the present invention. After starting the calibration (step 601), the input of the amplifier is switched from a signal source to a predetermined input load (step 605). A difference between the output connected to the input load and the output connected to the predetermined input load is measured (step 607). This difference is measured (step 607) from the amplifier output with the amplifier input connected to the signal source and the amplifier connected to the input load, and may, for example be a difference is taken between the amplifier connected to the signal source and the amplifier connected to the input load. A determination is then made of the output of the amplifier corresponding to the first and second switch states (step 608). The difference in these outputs is the calibrated measurement (step 611).

Use of Attenuation for RoT Measurements

Figure 7:
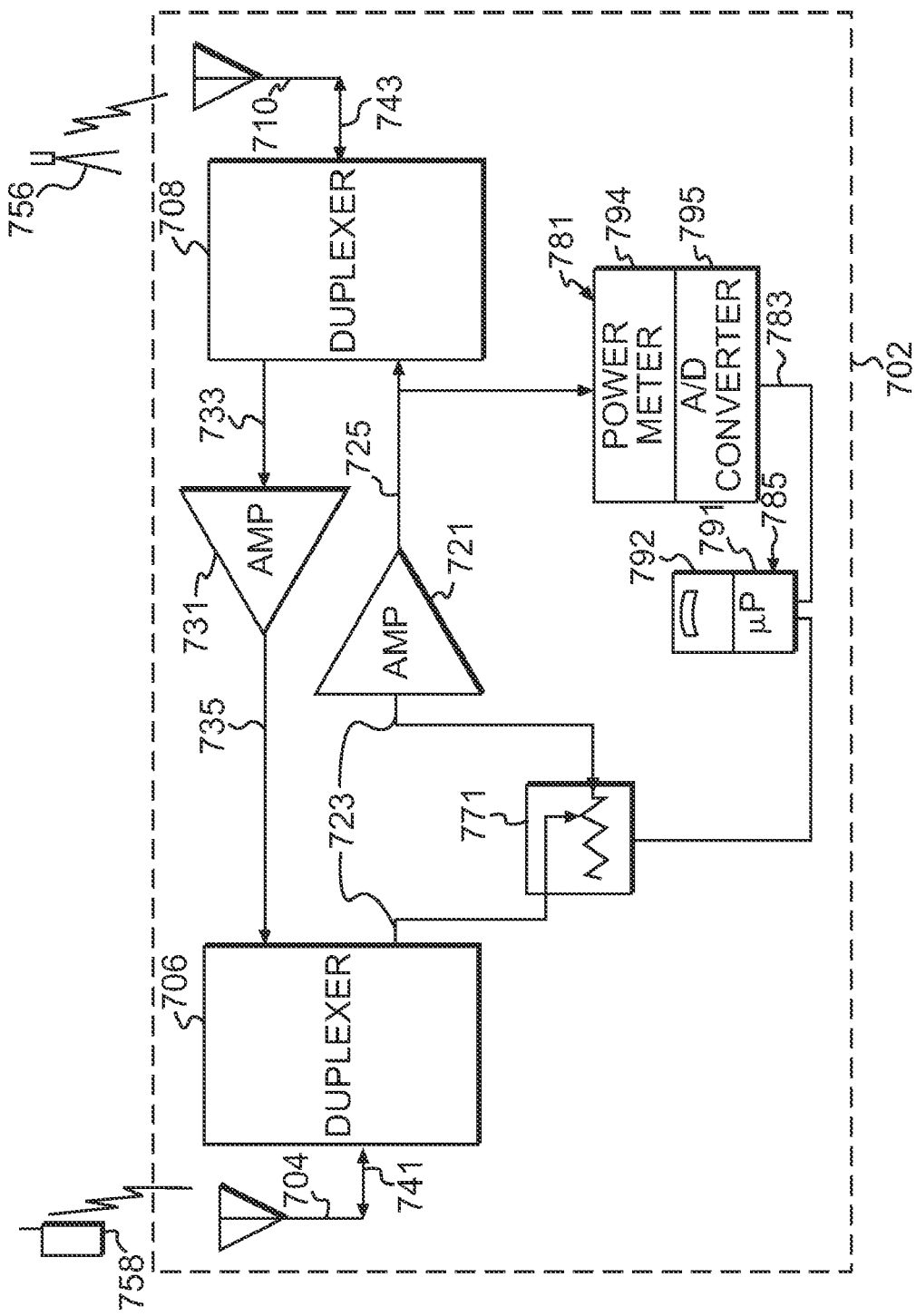
FIG. 7 is a schematic block diagram showing a repeater in which attenuation of a signal input is used to obtain a RoT measurement.

FIG. 7 is a schematic block diagram showing a repeater 702, in which attenuation of a signal input is used to obtain an RoT measurement. The repeater 702 is comprised of a server antenna 704, a server duplexer 706 a donor output duplexer 708 and a donor antenna 710. A reverse link or uplink amplifier 721 is connected to the server duplexer 706 by an input link 723 and to the donor output duplexer 708 by an output link 725. A forward link or downlink amplifier 731 is connected to the donor duplexer 708 by a forward link connection output 733 and is connected to the server duplexer 706 by a forward link connection input 735. A server antenna link 741 connects the server antenna 704 to duplexer 706 and a donor antenna link 743 connects the donor antenna to duplexer 708. The depiction of a single amplifier in each of the forward and in the reverse directions is a simplification, and in practice, the reverse and forward link amplifiers 721, 731 are each configured as multiple amplifiers, such as a low noise amplifier and a power amplifier.

In the forward path, the donor antenna 710 receives a wireless signal from a base station 756 and transmits the received signal to duplexer 708 through the donor antenna link 743. Duplexer 708 receives the signal and transmits the signal to the forward link amplifier 731. The forward link amplifier 731 amplifies the signal from the duplexer 708 and transmits the signal to server duplexer 706. Server duplexer 706 receives the signal and transmits the signal to the server antenna 704 through the server antenna link 741. The server antenna 704 receives the signal from server duplexer 706 and transmits a wireless signal to a wireless communication device (WCD) 758 such as a mobile phone. In the reverse path, the server antenna 704 receives a framed shared channel communication signal from a communication device 758. The server antenna 704 transmits the received signal to server duplexer 706 through the server antenna link 741. Server duplexer 706 receives the received signal and transmits the received signal to the reverse link amplifier 721 through the server antenna link 741. The reverse link amplifier 721 amplifies a framed shared channel communication signal from server duplexer 706 and transmits the signal to duplexer 708 through the output link 725. The duplexer 708 receives the signal from the reverse link amplifier 721 and transmits the signal to the donor antenna 710 through the donor antenna link 743. The donor antenna 710 receives the signal from the duplexer 708 and transmits a wireless signal to the base station. This reverse operation comprises the reverse link of the repeater for communication from the mobile phone to the base station.

In lieu of the RF switch (271, FIG. 2), an RF attenuator 771 is added to the repeater in the reverse link gain path, between the server antenna 704 and the reverse link amplifier 721. In the configuration depicted, the RF attenuator 771 is interposed between the server duplexer 706 and the reverse link amplifier 721. The RF attenuator 771 performs is used to attenuate the signal from the server antenna 704 received through duplexer 706. A calibration impedance is presented to the reverse link amplifier 721 when the attenuator is in the high attenuation state and provides calibration of the thermal noise level by attenuating any WCD signals well below the thermal energy level. Since the attenuator characteristic impedance is matched to the circuit impedance (for example, 50 ohms) this provides the correct impedance for thermal calibration. If the amplifier is well matched in it's nominal impedance by the nominal impedance of the attenuator, the circuit get a valid estimate of thermal noise.

In normal operation, RF attenuator 771 would reduce attenuation between the reverse link amplifier chain to the server antenna so that normal reverse link traffic could go through the repeater unattenuated. In the calibration mode, the input to the connection between the duplexer 723 and the reverse link amplifier 721 would be attenuated, so that the majority of the input to the reverse link amplifier 721 would be from the circuit which includes the attenuator 771. As is the case with the RF switch (221, FIG. 2), the RF attenuator 771 substantially attenuates the signal received through the server antenna 704 and duplexer 706 provided to the reverse link amplifier 721. The power difference between the two states at the output of the amplifier would then yield a calibrated measurement of the rise-over-thermal value.

As is the case with the circuit of FIG. 2, the circuit of FIG. 7 uses an integrated power detector 781, which includes an output link 783 to a control circuit 785. The control circuit 785 includes a processor 791 and a memory 792, and functions as a controller to control the operation of RF attenuator 771. Integrated power detector 781 includes a power sensor 794 and an A/D converter 795. The control circuit 785 uses signals from integrated power detector 781 to determine the output power of the reverse link amplifier 771. The integrated power detector 781 includes a power sensor 787 and an A/D converter 788. The processor 785 uses signals from integrated power detector 781 to determine power measurements in response to instructions stored in memory 792. Typically, the signals provided by the integrated power detector 781 to the control circuit 785 are power metrics.

Normal operation of the repeater 702 is performed with the RF attenuator 771 at zero attenuation (signal passing straight through with little or no attenuation or loss). Calibration is preformed by putting the RF attenuator 771 in a state of high attenuation, such that all WCD (phone) signals from the server antenna 704 received through duplexer 706 are attenuated to a level that is much less than thermal noise power. In this way the amplifier 721 sees two signals; normal WCDs with the RF attenuator 771 in the zero attenuation state and mostly thermal noise with the RF attenuator 771 in the high attenuation state. This allows the processor to calculate RoT. There is a requirement on the attenuator that the maximum value of attenuation be large enough such that any WCD signal be attenuated to a value significantly below thermal noise, such that the WCD signals are not corrupting the nominal value of thermal noise. A ratio of 20 dB below thermal would be sufficient in a practical system.

Functional Operation of Communication Station

Figure 8:
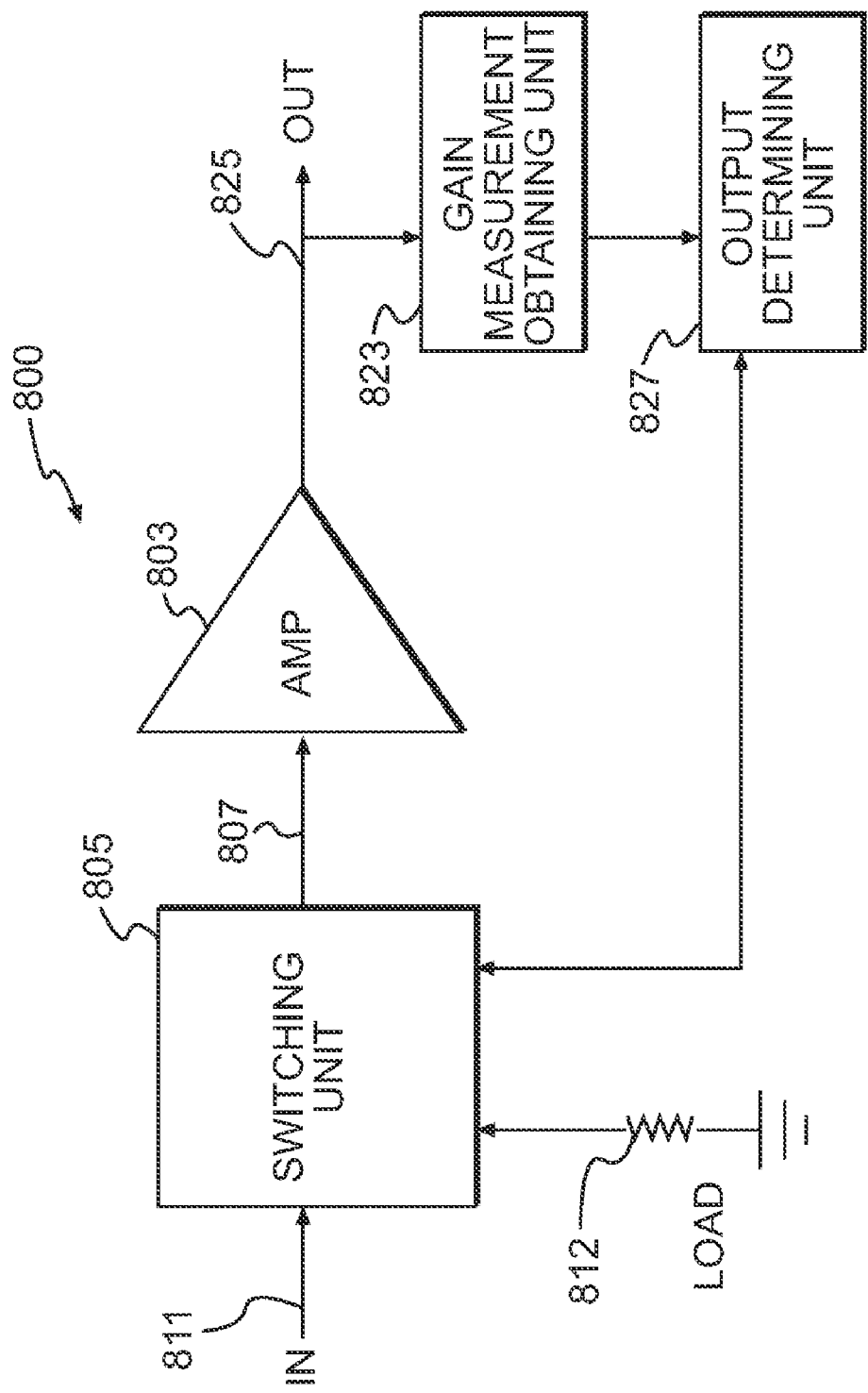
FIG. 8 is a diagram showing the functional operation of the inventive radio frequency communication station.

FIG. 8 is a diagram showing the functional operation of a radio frequency communication station 800 that is capable of calibrating gain and noise. The station 800 obtains a measurement of an electrical property, such as RoT from an amplifier 803 in order to perform its calibration. A switching unit 805 provides an input 807 to the amplifier 803 and is used to switch the input 807 between a first state, in which the amplifier 803 receives its signal from a signal source 811 and a second state, in which the amplifier 803 receives its signal from a load 812. A gain measurement unit 823 receives the amplifier's output 825 and provides the measurements to an output-determining unit 827. The output-determining unit 827 measures an electrical property of the output. The electrical property is obtained by determining the correspondence between the measurements taken in the first and second switching states, whereby the power difference between the two switch states at the output of the amplifier yields a calibrated measurement.

Each of the configurations depicted in FIGS. 2, 3, 7 and 8 can be used in a communication station to obtain a measurement of an electrical property by calibrating gain and noise. As described in connection with FIG. 2, means for controlling an input to an amplifier from a signal source is used so as to selectively provide a signal from the signal source to the amplifier in a first state, corresponding to a first switch state. Means for controlling the input may be RF switch 271. Means to provide a predetermined input load at least during a second state, corresponding to a second switch state, may be provided. The predetermined input load may be the 50 ohm load, so that the RF switch 271 and the 50 ohm load provide means for controlling the input substantially attenuates the signal to the amplifier. The integrated power detector 281 provides means for measuring a difference between an output of the amplifier corresponding to the first state corresponding to the signals received by the amplifier from the signal source and the second state. The integrated power detector 281, including the power sensor 294 and A/D converter 295. provide means for determining an output of the amplifier corresponding to the first and second states, whereby the power difference between the two states at the output of the amplifier yields a calibrated measurement.

The above functions can be achieved by CDMA repeater system 302 (FIG. 3), by repeater 702 (FIG. 7), in which attenuation of a signal input is used to obtain an RoT measurement, and by radio frequency communication station 800 (FIG. 8)

Additional Variations

While measurement of RoT in the reverse link is described, it is also possible to provide measurements in the forward link by appropriate placement of the components.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, microprocessor, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. In a radio frequency communication station, a method of calibrating gain and noise of a signal, the method comprising:
   determining whether the calibrating of the gain and the noise is performed based at least in part on a timestamp;
   determining a period of a frame corresponding to a frame rate of a communication carried by the signal;
   selecting a period of time for a test sequence shorter than the period of the frame, over which an interruption of a signal source does not substantially interrupt the communication;
   switching an input to an amplifier between the signal source and a predetermined input load within the period of time;
   measuring a difference between an output of the amplifier corresponding to a first switch state corresponding to signals received by the amplifier from the signal source and a second switch state corresponding to the amplifier connected to the predetermined input load;

determining an output of the amplifier corresponding to the first and second states, whereby the difference at the output of the amplifier, resulting from the switching the input of the amplifier, yields a calibrated measurement; and storing the calibrated measurement with the timestamp.

2. The method of claim 1 wherein the output of the amplifier provides a rise-over-thermal (RoT) value, corresponding to a ratio of total power received by the amplifier, over thermal noise from the amplifier.

3. The method of claim 2, wherein in a calibration mode, the amplifier receives its input from the predetermined input load, and the difference between two switching states of the switch at the output of the amplifier yields a calibrated measurement of the rise-over-thermal (RoT) value.

4. The method of claim 3 further comprising:
in the case of RoT values measured at or below a predetermined threshold, using a first nominal sampling cycle for measuring RoT; and
in the case of RoT values exceeding the predetermined threshold, reducing a frequency of the sampling cycle.

5. The method of claim 4 further comprising performing the switching of the input to the RF amplifier within a period of time less than a time selected in accordance with loss of a communication link determined by a predetermined fast fade time for the communication link.

6. The method of claim 4 further comprising performing the switching of the input to the RF amplifier within a period of time less than a time selected in accordance with loss of a communication link determined by a fast fade time value for the communication link.

7. The method of claim 1 further comprising performing the switching of the input to the RF amplifier within a period of time less than a time selected in accordance with loss of a communication link determined by a predetermined fast fade time for the communication link.

8. The method of claim 1 comprising switching the input to the amplifier with a switch located between the signal source and the amplifier, the switch selectively connecting the predetermined input load to the amplifier.

9. The method of claim 1 further comprising providing the predetermined input load as a calibration load, thereby using the switches for selectively receiving signals between the amplifier and the signal source to selectively connect the calibration load to the amplifier.

10. The method of claim 1, wherein switching an input to an amplifier between the signal source and a predetermined input load within the period of time is scheduled in advance for one or more specific periods based at least in part on traffic through the radio frequency communication station.

11. A communication device that provides a measurement of communication signal traffic, the communication device comprising:
a control device connected to a signal input of a signal amplifier, said control device controlling a signal input to the signal amplifier between a first state in which the signal amplifier receives a first input that receives a signal and a second state, with the signal to the signal amplifier substantially attenuated in the second state;
a load connected to said signal amplifier so as to provide an input to the signal amplifier in at least the second state;
a controller that operates said control device in said first and second states, wherein said controller provides, as one operating mode, a function of switching between the first state and the second state at an operational mode test rate controlled based at least in part on a timestamp, the operational mode test rate having a signal input off time less than a time selected in accordance with loss of a communication link, and a duration of the second state greater than a minimum quiescent time for obtaining a measurement of an electrical property in a quiescent mode consistent with the connection of said load to the signal amplifier with the signal substantially attenuated, thereby providing a sensing of the signal input in said quiescent mode without interrupting communication transmitted through the signal amplifier; and
a memory that stores a value based at least in part upon the measurement of the electrical property with the timestamp.

12. The communication device of claim 11 further comprising a detector in communication with an output of the signal amplifier that obtains a gain measurement of the amplifier, the detector measures an amplifier output and obtains an indication of signal output from the amplifier in the quiescent mode and in the operating mode.

13. The communication device of claim 11 further comprising a detector in communication with an output of the signal amplifier that obtains an output power measurement of the amplifier, and obtains an indication of signal output power values in the quiescent mode and in the operating mode, thereby providing an indication of received signal power.

14. The communication device of claim 11 further comprising a circuit for rendering a rise-over-thermal (RoT) measurement by comparing the measurement of the electrical property in the quiescent mode, with a measurement of the electrical property obtained in a non-quiescent mode, wherein the control device connects the signal input to the signal amplifier to establish the non-quiescent mode wherein the electrical property corresponds to signal power.

15. The communication device of claim 11 wherein the output of the signal amplifier provides a rise-over-thermal (RoT) value, corresponding to a ratio of total power received by the amplifier, over thermal noise from the amplifier.

16. The communication device of claim 11, wherein the control device comprises a switch connected to a signal input of a signal amplifier, said switch switching between a first input that receives a signal and a second input, said switch switching between said first input and said second input.

17. The communication device of claim 11, wherein the control device comprises an attenuator connected to a signal input of a signal amplifier and the amplifier, said attenuator effecting said attenuation of the signal to the amplifier in the second state.

18. A program storage device readable by a machine tangibly embodying a program of instruction executable by the machine to perform method steps for obtaining a measurement of a signal property value in a radio frequency communication station, the method steps comprising:
determining whether to obtain the measurement based at least in part on a timestamp;
controlling an input to an RF amplifier so as to perform an alternate connection of an input to the RF amplifier with a signal source to obtain an active state measurement and substantially attenuating the signal source provided to the RF amplifier, with the RF amplifier connected to receive a predetermined calibration input load in at least a second state, to determine a quiescent state measurement, whereby the power difference between the two control states at an output of the amplifier yields a calibrated measurement of a signal quality;

performing the alternate connection of the input to the RF amplifier within time parameters limited by a maximum time at which communication received by the amplifier from the signal source degrades within predetermined limits and a minimum time required to obtain said quiescent state measurement; and storing a value based on the calibrated measurement of the signal quality with the timestamp.

19. The program storage device of claim 18 wherein the calibrated measurement of a signal quality provides a rise-over-thermal (RoT) value, corresponding to a ratio of total power received by the amplifier, over thermal noise from the amplifier.

20. The program storage device of claim 18, wherein the time parameters establish the control state for the predetermined calibration input load at a time less than a time selected in accordance with loss of a communication link corresponds to a predetermined fast fade time for the communication link or by a fast fade time value for the communication link.

21. A radio frequency communication station capable of calibrating gain and noise, the communication station comprising:
    means for determining whether to calibrate the gain and the noise based at least in part on a timestamp;
    means for determining a period of a frame corresponding to a frame rate of a communication carried by the signal;
    means for selecting a period of time for a test sequence shorter than the period of the frame, over which an interruption of a signal source does not substantially interrupt the communication;
    means for controlling an input to an amplifier from the signal source so as to selectively provide a signal from the signal source to the amplifier in a first state;
    means to provide a predetermined input load at least during a second state, in which the means for controlling the input substantially attenuates the signal to the amplifier;
    means for switching between the first state and the second state within the period of time for the test sequence;
    means for measuring a difference between an output of the amplifier corresponding to the first state corresponding to the signals received by the amplifier from the signal source and the second state;
    means for determining an output of the amplifier corresponding to the first and second states, whereby the difference between the two states at the output of the amplifier yields a calibrated measurement; and
    means for storing the calibrated measurement with the timestamp.

22. The communication station of claim 21 wherein the means for controlling includes means for switching an input to the amplifier between the signal source and the predetermined input load, the means for switching located between the signal source and the amplifier to selectively connect the predetermined input load to the amplifier.

23. The communication station of claim 22, wherein in a calibration mode, the amplifier receives the input from the predetermined input load, and the power difference between two switching states of the means for switching at the output of the amplifier yields the calibrated measurement of the rise-over-thermal (RoT) value.

24. The communication station of claim 23 further comprising:
    in the case of RoT values measured at or below a predetermined threshold, means for using a first nominal sampling cycle for measuring RoT; and
    in the case of RoT values exceeding the predetermined threshold, means for causing the amplifier to go to a longer duty cycle.

25. The communication station of claim 24 further comprising means for performing the switching of the input to the RF amplifier within a period of time less than a time selected in accordance with loss of a communication link determined by a predetermined fast fade time for the communication link or determined by a fast fade time value for the communication link.

26. The communication station of claim 21 further comprising means for providing the predetermined input load as a calibration load, thereby using the means for switching for selectively receiving signals between the amplifier and the signal source to selectively connect the calibration load to the amplifier.

27. In a radio frequency communication station, a method of calibrating gain and noise of a signal, the method comprising:
    determining whether to calibrate the gain and the noise based at least in part on a timestamp or an available number of readings;
    determining a period of a frame corresponding to a frame rate of a communication carried by the signal;
    selecting a period of time for a test sequence shorter than the period of the frame, over which an interruption of a signal does not substantially interrupt the communication, determined by a predetermined fast fade time for the communication link or determined by a fast fade time value for the communication link;
    effecting control of an input to an amplifier between a first state corresponding to signals received by the amplifier and a second state corresponding to the amplifier connected to a predetermined input load by reducing a signal received in the second state so as to substantially attenuate the signal from a signal source;
    establishing a connection of the input of the amplifier at a predetermined input load, at least during the second state;
    measuring a difference between an output of the amplifier corresponding to the first state and the second state;
    determining an output of the amplifier corresponding to the first state and the second state, whereby the power difference between the first state and the second state at the output of the amplifier yields a calibrated measurement; and
    storing the calibrated measurement with the timestamp;
    wherein effecting control of the input to an amplifier between the first state and the second state is performed within the period of time.

28. The method of claim 27 wherein the output of the amplifier provides a rise-over-thermal (RoT) value, corresponding to a ratio of total power received by the amplifier, over thermal noise from the amplifier.

29. The method of claim 28 further comprising:
    in the case of RoT values measured at or below a predetermined threshold, using a first nominal sampling cycle for measuring RoT;
    in the case of RoT values exceeding the predetermined threshold, reducing the frequency of the sampling cycle.

30. A radio frequency communication station capable of calibrating gain and noise, the communication station comprising:
    an amplifier;
    an input load;
    an input control circuit to the amplifier from a signal source capable of selectively providing a signal from the signal source to the amplifier in a first state and providing a test signal connection at least during a second state, where selectively providing the signal from the signal source to the amplifier and providing the test signal connection is based at least in part on a timestamp;

a signal measurement circuit responsive to an output of the amplifier, and capable of determining outputs of the amplifier corresponding to the first state and the second state, whereby the input control circuit provides a signal input off time less than a time related to loss of a communication link, and a duration of the second state greater than a minimum test time for obtaining a measurement of an electrical property in a quiescent mode, thereby providing a sensing of the amplifier output in second state without interrupting communication transmitted through the amplifier; and a memory that stores a calibration value with the timestamp, the calibration value based at least in part upon the outputs of the amplifier in corresponding to the first state and the second state.

31. The communication station of claim 30, wherein in a calibration mode, the amplifier receives input from a predetermined input load, and the power difference between the first state and the second state at the output of the amplifier yields a calibrated measurement value.

32. The communication station of claim 30 wherein the input control circuit provides the signal input off time selected in accordance with loss of a communication link determined by a predetermined fast fade time for the communication link or determined by a fast fade time value for the communication link.

33. The communication station of claim 30, the input control circuit includes at least a switch located between the signal source and the amplifier, the switch selectively connecting the predetermined input load to the amplifier.

34. The communication station of claim 30, wherein the an input control circuit further schedules in advance for one or more times when the input control circuit selectively provides a signal from the signal source to the amplifier in a first state and provides a test signal connection at least during a second state.

35. A system including a radio frequency communication station capable of calibrating gain and noise, the communication station comprising:

employing a processor executing computer executable instructions embodied on a non-transitory computer readable media to perform the following acts:

determining whether calibrating of the gain and the noise is to be performed based at least in part on a timestamp or an available number of readings;

determining a period of a frame corresponding to a frame rate of a communication carried by the signal;

selecting a period of time for a test sequence shorter than the period of the frame, over which an interruption of a signal source does not substantially interrupt the communication;

switching an input to an amplifier between the signal source and a predetermined input load within the period of time;

measuring a difference between an output of the amplifier corresponding to a first switch state corresponding to signals received by the amplifier from the signal source and a second switch state corresponding to the amplifier connected to the predetermined input load; and determining an output of the amplifier corresponding to the first and second states, whereby the difference at the output of the amplifier, resulting from the switching the input of the amplifier, yields a calibrated measurement storing the calibrated measurement with the timestamp.

* * * * *